(12) United States Patent
Doelle

(10) Patent No.: US 6,210,533 B1
(45) Date of Patent: Apr. 3, 2001

(54) REVOLVER VALVE FOR DISCHARGING A PRESSURIZED VESSEL IN A FIBER STOCK PREPARATION SYSTEM

(75) Inventor: Klaus Doelle, Appleton, WI (US)

(73) Assignee: Voith Sulzer Paper Technology North America, Inc., Appleton, WI (US)

( * ) Notice: Subject to any disclaimer, the term of this patent is extended or adjusted under 35 U.S.C. 154(b) by 0 days.

(21) Appl. No.: 09/215,871

(22) Filed: Dec. 18, 1998

(51) Int. Cl.[7] .............................. D21C 7/08; G01F 11/00
(52) U.S. Cl. .................... 162/246; 222/370; 414/217; 414/219
(58) Field of Search ................ 251/283; 222/544, 222/491, 14, 59, 71, 252, 370, 394; 184/72, 35; 73/265; 137/98, 624.11, 561; 162/246, 52; 414/217, 219, 220

(56) References Cited

U.S. PATENT DOCUMENTS 3,995,777 * 12/1976 Diez et al. ........................ 222/370
5,223,090   6/1993 Klungness et al. .................. 162/9
5,819,992 * 10/1998 Scott ................................... 222/370

* cited by examiner

*Primary Examiner*—Dean T. Nguyen
(74) *Attorney, Agent, or Firm*—Taylor & Aust, P.C.

(57) ABSTRACT

A revolver valve includes a housing with a cylindrical inner chamber, and a pair of end caps respectively attached to each end of the housing. One of the end caps includes an inlet opening and the other end cap includes an outlet opening. A cylindrical rotor body is rotatably disposed within the inner chamber of the housing. The rotor body includes a pair of end faces respectively positioned closely adjacent to the end caps, and a plurality of longitudinally extending cylinders extending between the end faces. Each cylinder is positioned generally concentrically about an axis of rotation of the rotor body, whereby the plurality of cylinders are sequentially disposed in communication with the inlet opening and the outlet opening during rotation of the rotor body within the inner chamber during use. The revolver valve is preferably used in a fiber stock preparation system in conjunction with a fiber loading apparatus having a pressurized vessel.

7 Claims, 3 Drawing Sheets

REVOLVER VALVE FOR DISCHARGING A PRESSURIZED VESSEL IN A FIBER STOCK PREPARATION SYSTEM

BACKGROUND OF THE INVENTION

1. Field of the Invention

The present invention relates to a fiber stock preparation system for preparing a fiber suspension for use in a paper-making machine, and, more particularly, to an apparatus for discharging a pressurized fluid from a pressurized vessel in such a fiber stock preparation system.

2. Description of the Related Art

A fiber stock preparation system is used to prepare fiber stock or a fiber suspension which is used in a paper-making machine for the production of a fiber web. To provide a finished fiber web with certain physical characteristics, it is known to load the fibers in the fiber stock with a chemical compound. For example, it is known to load the fibers in a fiber stock with calcium carbonate using a pressurized vessel. For the details of such a fiber loading system, reference is hereby made to U.S. patent application Ser. No. 09/130,176, entitled "APPARATUS AND METHOD FOR CHEMICALLY LOADING FIBERS IN A FIBER SUSPENSION", filed Aug. 6, 1998, which is incorporated herein by reference.

In a fiber loading system as described above, the pressurized vessel must be maintained in a pressurized state to effect proper loading of the fibers in the fiber stock. Nonetheless, the pressurized vessel is typically discharged to a transport system such as a conveyor or auger which is in communication with ambient atmospheric pressure. Thus, it is necessary to maintain the interior of the pressurized vessel at a relatively high pressure while at the same time allowing the loaded fiber stock to be discharged to an ambient pressure.

What is needed in the art is an apparatus which maintains a pressurized vessel in a fiber stock preparation system at a higher pressure while allowing the fiber stock to be discharged to ambient pressure.

What is further needed in the art is an apparatus for discharging a pressurized vessel in a fiber stock preparation system which has an adequate flow rate to supply a loaded fiber stock to a paper-making machine, and is simple and relatively inexpensive to manufacture.

SUMMARY OF THE INVENTION

The present invention provides a revolver valve with a rotor body disposed within a housing and having a plurality of cylinders which are non-simultaneously disposed in communication with an inlet opening and an outlet opening in an end cap attached to the housing, thereby discharging the pressurized fluid to ambient pressure without substantially decreasing the pressure at the inlet opening.

The invention comprises, in one form thereof, a revolver valve having a housing with a cylindrical inner chamber. A pair of end caps are respectively attached to each end of the housing. One of the end caps includes an inlet opening and the other end cap includes an outlet opening. A cylindrical rotor body is rotatably disposed within the inner chamber of the housing. The rotor body includes a pair of end faces respectively positioned closely adjacent to the end caps, and a plurality of longitudinally extending cylinders extending between the end faces. Each cylinder is positioned generally concentrically about an axis of rotation of the rotor body, whereby the plurality of cylinders are sequentially disposed in communication with the inlet opening and the outlet opening during rotation of the rotor body within the inner chamber during use. The revolver valve is preferably used in a fiber stock preparation system in conjunction with a fiber loading apparatus having a pressurized vessel.

An advantage of the present invention is that a fluid in a pressurized vessel can be discharged to ambient pressure without substantially reducing the higher pressure in the pressurized vessel.

Another advantage is that the pressurized vessel can be discharged at a relatively high flow rate which is sufficient to supply a downstream portion of a fiber stock preparation system.

Yet another advantage is that a portion of the high pressure in a cylinder traveling between the inlet opening and the outlet opening is bled off to an ambient pressure in a cylinder traveling between the outlet opening and the inlet opening to conserve some of the high pressure.

Still another advantage is that a high pressure line is in communication with each cylinder as it travels past the outlet opening, thereby pushing the fluid out the outlet opening and increasing the discharge throughput rate.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
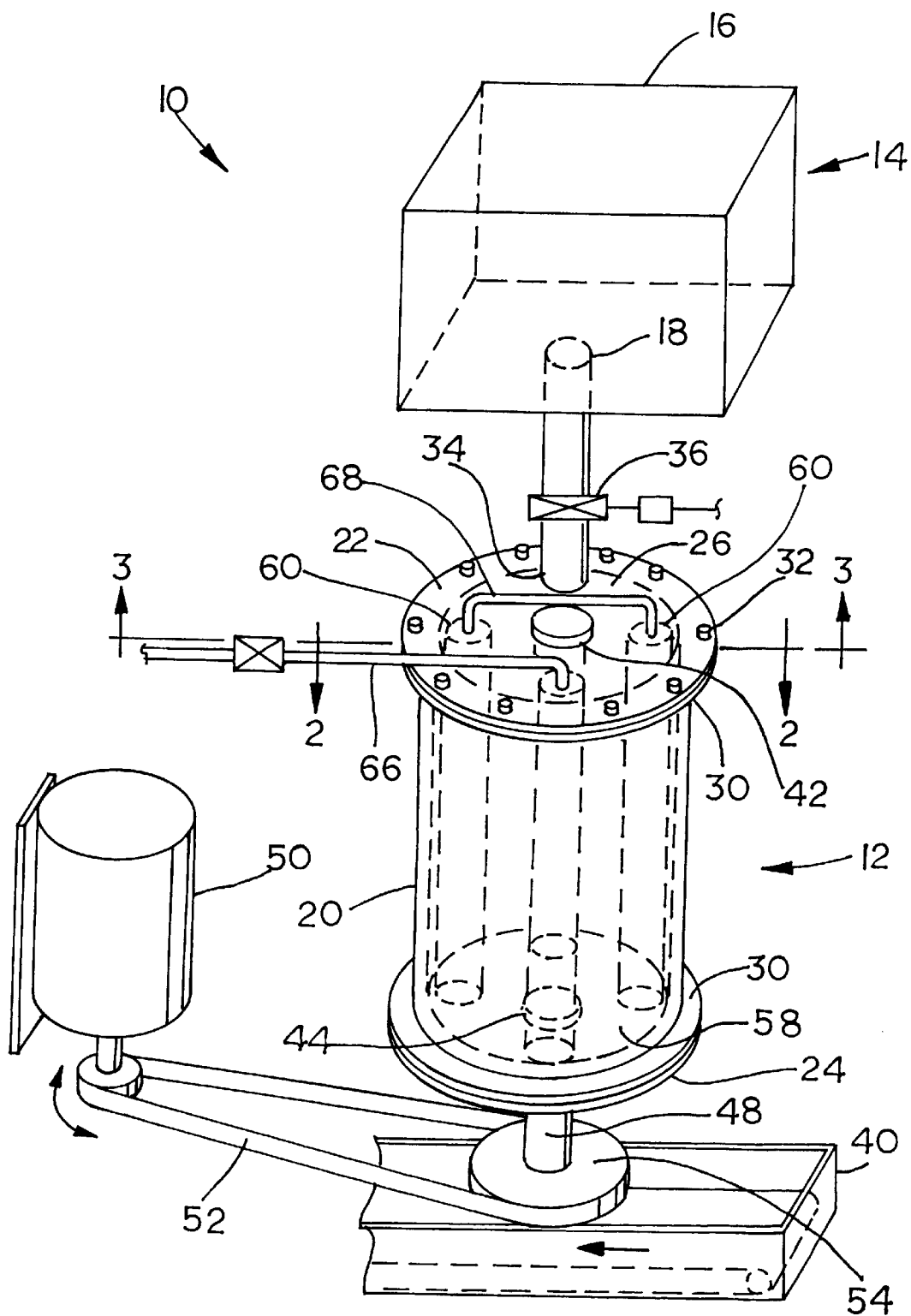
FIG. 1 is a perspective view of a portion of a fiber stock preparation system including an embodiment of a revolver valve of the present invention connected with a fiber loading apparatus.

Referring now to the drawings, there is shown an embodiment of a fiber stock preparation system 10 including an embodiment of a revolver valve 12 of the present invention which is connected with and receives loaded fiber stock under pressure from a fiber loading apparatus 14.

Fiber loading apparatus 14 is configured for loading fibers in a fiber suspension with a chemical compound. For example, fiber loading apparatus 14 may be configured to load fibers in a fiber suspension with calcium carbonate. Fiber loading apparatus 14 includes a pressurized vessel 16 with an outlet 18 for discharging the loaded fiber suspension. Pressurized vessel 16 is shown in simplified form merely as a block in FIG. 1 for ease of illustration. For details of one embodiment of a fiber loading apparatus 14 which may be used with a revolver valve 12 of the present invention, reference is hereby made to U.S. patent application Ser. No.

09/130,176, entitled "APPARATUS AND METHOD FOR CHEMICALLY LOADING FIBERS IN A FIBER SUSPENSION", filed Aug. 6, 1998.

Revolver valve 12 generally includes a housing 20, pair of end caps 22 and 24, and a rotor body 26. Housing 20 is a hollow cylinder with an inner chamber 28. A pair of flanges 30 extend radially from housing 12 at each end thereof and allow interconnection with end caps 22 and 24.

End caps 22 and 24 are respectively attached to a flange 30 at each end of housing 20. More particularly, each end cap 22 and 24 includes a plurality of openings which align with threaded openings in a corresponding flange 30. Threaded fasteners, such as bolts 32, pass through the openings in end caps 22 and 24 and threadingly engage the internally threaded openings in flanges 30. A gasket or seal (not shown) is positioned between each end cap 22 and 24 and a corresponding flange 30 to substantially seal inner chamber 28 from the ambient environment.

End cap 22 includes an inlet opening 34 which is connected with outlet 18 of fiber loading apparatus 14. Inlet opening 34 is positioned at a predetermined radial distance from an axis of symmetry of end cap 22, as will be described in more detail hereinafter. A controllable valve 36 interconnects outlet 18 with inlet opening 34 and is used to control a flow of the loaded fiber suspension into revolver valve 12. Controllable valve 36 may be of any suitable configuration providing controllable flow into revolver valve 12.

End cap 24 includes an outlet opening 38 which is positioned generally opposite from inlet opening 34, relative to an axis of symmetry of each of end caps 22 and 24. Outlet opening 38 connects inner chamber 28 within housing 20 with the ambient environment for discharging the loaded fiber suspension to ambient pressure. The loaded fiber suspension may be transported away from revolver valve 12 using, e.g., a transport conveyor 40 or any other suitable transport apparatus.

Each end cap 22 and 24 also includes a respective bearing assembly 42 and 44 which rotatably carries rotor body 26 within inner chamber 28. Bearing assemblies 42 and 44 may be, e.g., roller bearing assemblies which are attached to or carried within a recess formed in each corresponding end cap 22 and 24.

Rotor body 26 is a cylindrical body which is rotatably disposed within inner chamber 28 of housing 20. A shaft 46 which extends from each end of rotor body 26 is received within a corresponding bearing assembly 42 and 44 carried by end caps 22 and 24, respectively. An end 48 of shaft 46 associated with bearing assembly 44 extends through bearing assembly 44 and end cap 24. A rotatable drive in the form of an electric motor 50 is interconnected with end 48 of shaft 46 via a belt 52 and pulley 54 to rotatably drive rotor body 26 within inner chamber 28. Of course, other types of rotatable drives such as gears, etc., may be used.

Rotor body 26 includes a pair of end faces 56 and 58 which are positioned closely adjacent to end caps 22 and 24, respectively. Rotor body 26 also includes a plurality of longitudinally extending cylinders 60 which extend between end faces 56 and 58. Cylinders 60 are positioned generally concentrically about an axis of rotation 62 above rotor body 26. During rotation of rotor body 26, each cylinder 60 sequentially travels past and is in communication with inlet opening 34 and outlet opening 38. By maintaining a small clearance between end faces 56 and 58 of rotor body 26 and end caps 22 and 24, each cylinder 60 is substantially sealed and maintains a pressure corresponding to either the higher pressure within inlet opening 34 or the ambient pressure within outlet opening 38, depending upon whether the cylinder 60 was last in communication with inlet opening 34 or outlet opening 38. In the embodiment shown, rotor body 26 includes four cylinders 60 which extend between end faces 56 and 58. However, it is to be appreciated that a different number of cylinders may be utilized, depending upon the particular application.

The operation of revolver valve 12 will now be described. For ease of illustration, the loading and unloading of a single cylinder 60 within rotor body 26 will be described. It is to be understood that each cylinder 60 within rotor body 26 is configured substantially identically and the loading and unloading process for each cylinder 60 is substantially the same.

During use, a fiber suspension is loaded with a chemical compound within fiber loading apparatus 14 and discharged to outlet 18 under pressure. Valve 36 is controllably actuated to control a flow of the loaded fiber suspension into inlet opening 34 in end cap 22. As a cylinder 60 rotates past inlet opening 34, the pressurized fluid within inlet opening 34 flows into and substantially fills the cylinder 60. As the cylinder 60 travels past inlet opening 34, it is substantially sealed at each end thereof with end caps 22 and 24 to define a closed volume. During rotation of rotor body 26, such as in the clockwise direction 64, between inlet opening 34 and outlet 38, the pressure within the cylinder 60 corresponds substantially to the pressure within inlet opening 34 (neglecting small pressure losses). As the cylinder 60 travels past outlet opening 38, the higher pressure loaded fiber suspension within the cylinder 60 is exposed to a lower pressure of the ambient environment at the discharge end of outlet opening 38. The loaded fiber suspension thus flows from the cylinder 60 and through outlet opening 38 to the ambient environment. The loaded fiber suspension is discharged from outlet opening 38 to a transport conveyor 40, such as a belt conveyor. As the cylinder 60 travels past outlet opening 38, the cylinder 60 is substantially sealed between end caps 22 and 24. The pressure within the cylinder 60 as the cylinder 60 travels past outlet opening 38 thus substantially corresponds to the ambient pressure. As the cylinder 60 travels to and comes into communication with inlet opening 34, the process repeats.

Revolver valve 12 may optionally also include a discharge pressure line 66 which is positioned generally longitudinally opposite from outlet opening 38 in end cap 24. Discharge pressure line 66 is configured to provide a fluid at a pressure which is higher than the ambient pressure at outlet opening 38 so that the fluid within each cylinder 60 is pushed through outlet opening 38 and into transport conveyor 40. The pressure within discharge pressure line 66 is also preferably higher than the pressure within inlet opening 34 so that the pressure differential as each cylinder 60 travels past outlet opening 38 and discharge pressure line 66 causes the loaded fiber suspension to quickly be expelled into transport conveyor 40. By providing a high pressure discharge pressure line 66 which pushes the loaded fiber suspension from outlet opening 38, the throughput rate of the loaded fiber suspension through revolver valve 12 may be increased.

Figure 3:
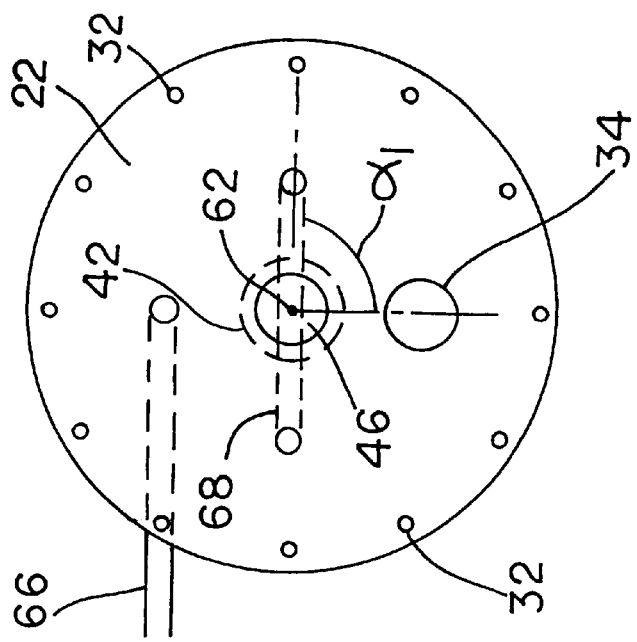
FIG. 3 is a sectional view of the revolver valve taken along line 3—3 in FIG. 1.
Figure 2:
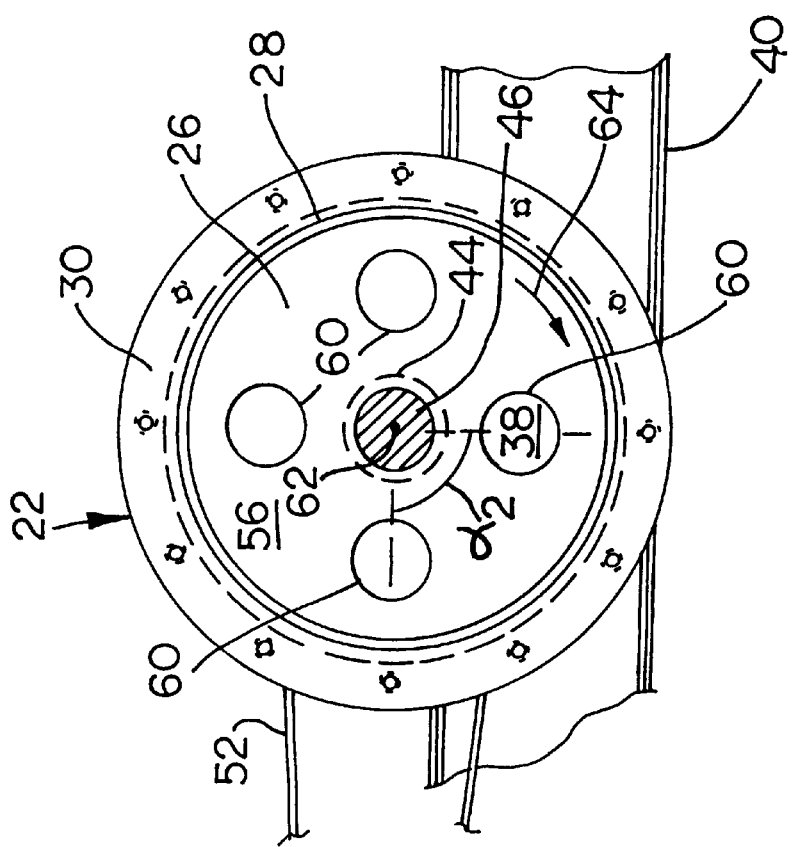
FIG. 2 is a sectional view of the revolver valve taken along line 2—2 in FIG. 1.
Figure 4:
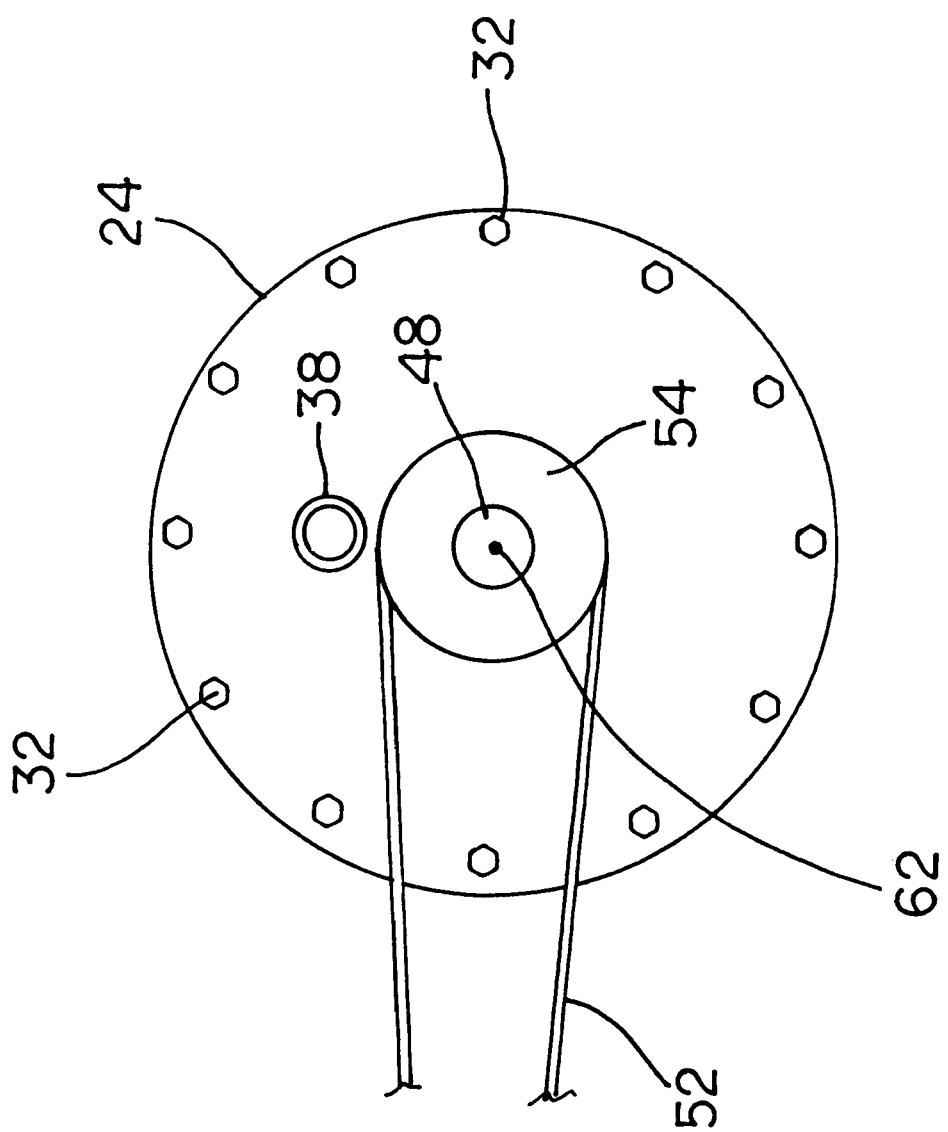
FIG. 4 is a bottom view of the revolver valve of FIG. 1.

Additionally, revolver valve 12 may be provided with a counter pressure line 68 which is attached at each end thereof with end cap 22 and is in fluid communication with inner chamber 28 within housing 20. Referring to FIG. 3, as each cylinder 60 travels past inlet opening 34 toward outlet opening 38, the cylinder travels through a quadrant of revolution $\alpha_1$ during which the cylinder 60 is at a higher pressure associated with the pressure within inlet opening 34. Conversely, referring to FIG. 2, as each cylinder 60 travels past outlet opening 38 toward inlet opening 34, the cylinder 60 travels through a quadrant of revolution $\alpha_2$ during which the cylinder 60 is at the lower ambient pressure associated with outlet opening 38. Counter pressure line 68 allows some of the high pressure within each cylinder 60 in the quadrant of revolution $\alpha_1$ to be scavenged or bled off to another cylinder travelling through the quadrant of revolution $\alpha_2$. To allow the high pressure from a cylinder 60 disposed in the quadrant of revolution $\alpha_1$, to be bled off into a cylinder 60 within the quadrant of revolution $\alpha_2$, it is necessary that the opposite ends of counter pressure line 68 be attached to end cap 22 at two locations such that the cylinder 60 in each quadrant of revolution substantially simultaneously passes each end of counter pressure line 68. In the embodiment shown, four cylinders are provided within rotor body 26 with a cylinder 60 being approximately 90° and 180° apart from two other cylinders 60. Thus, the opposite ends of counter pressure line 68 are positioned approximately 180° relative to the axis of rotation 62 of rotor body 26 on opposite sides of axis of rotation 62. If a different number of cylinders 60 are provided within rotor body 26, it may be necessary to position the opposite ends of counter pressure line 68 at a different angular orientation relative to axis of rotation 62.

Rotor body 26 is driven at any desirable rotational speed which is suitable for a particular application. In the embodiment shown, rotor body 26 is driven at a rotational speed of between approximately 10 and 30 revolutions per minute using electric motor 50.

In the embodiment shown, each end cap 22 and 24 is separate from and attached to housing 20 of revolver valve 12. However, it will also be appreciated that end caps 22 and/or 24 may be integrally formed with housing 20.

Additionally, in the embodiment shown, counter pressure line 68 is separate from and attached to end cap 22. However, it will be appreciated that counter pressure line 68 may be integrally formed with end cap 22.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A fiber stock preparation system, comprising:
   a fiber loading apparatus configured for loading fibers in a fiber suspension, said fiber loading apparatus including a pressurized vessel with an outlet for discharging the loaded fiber suspension; and
   a revolver valve comprising:
      a housing having an inner chamber;
      a pair of end caps respectively attached to each end of said housing, one of said end caps including an inlet opening connected with said outlet of said fiber loading apparatus, and an other of said end caps including an outlet opening; and
      a rotor body rotatably disposed within said inner chamber of said housing, said rotor body including a pair of end faces respectively positioned closely adjacent to said end caps, and a plurality of longitudinally extending cylinders extending between said end faces, each said cylinder positioned generally concentrically about an axis of rotation of said rotor body whereby said plurality of cylinders are sequentially disposed in communication with said inlet opening and said outlet opening during rotation of said rotor body within said inner chamber during use, a position of said inlet opening in said one end cap and a position of said outlet opening in said other end cap defining two quadrants of revolution of said rotor body, one of said end caps including a counter pressure line extending between said two quadrants of revolution.

2. The fiber stock preparation system of claim 1, wherein said inlet opening in said one end cap and said outlet opening in said other end cap are positioned generally on opposite sides of said axis of rotation.

3. The fiber stock preparation system of claim 1, wherein said one end cap with said inlet opening includes said counter pressure line.

4. The fiber stock preparation system of claim 3, wherein said counter pressure line is integrally formed within said one end cap.

5. The fiber stock preparation system of claim 1, wherein said one end cap having said inlet opening also includes a discharge pressure line positioned generally longitudinally opposite from said outlet opening in said other end cap, said discharge pressure line configured to provide a fluid at a pressure which is higher than a pressure at said outlet opening as said cylinders rotate therepast.

6. The fiber stock preparation system of claim 1, further comprising a pair of bearing assemblies respectively carried by said pair of end caps, each said bearing assembly rotatably carrying said rotor body.

7. The fiber stock preparation system of claim 6, wherein said rotor body includes a shaft extending from each end thereof, each said bearing carrying an opposite end of said shaft, one end of said shaft extending through a corresponding bearing and end cap, and further comprising a rotatable drive connected to said one end of said shaft.

* * * * *